(12) United States Patent
Binder et al.

(10) Patent No.: US 11,664,709 B2
(45) Date of Patent: May 30, 2023

(54) HOLDING APPARATUS FOR A SLIP RING UNIT, SLIP RING BRIDGE, SLIP RING UNIT, ELECTRIC MACHINE, AND WIND TURBINE

(71) Applicant: Flender GmbH, Bocholt (DE)

(72) Inventors: Herbert Binder, Neuburg (DE); Robert Gruber, Ruhstorf (DE); Oliver Memminger, Neuburg a. Inn (DE)

(73) Assignee: Flender GmbH, Bocholt (DE)

( * ) Notice: Subject to any disclaimer, the term of this patent is extended or adjusted under 35 U.S.C. 154(b) by 305 days.

(21) Appl. No.: 17/263,470

(22) PCT Filed: Jul. 17, 2019

(86) PCT No.: PCT/EP2019/069245
§ 371 (c)(1),
(2) Date: Jan. 26, 2021

(87) PCT Pub. No.: WO2020/020722
PCT Pub. Date: Jan. 30, 2020

(65) Prior Publication Data
US 2021/0167670 A1   Jun. 3, 2021

(30) Foreign Application Priority Data
Jul. 27, 2018 (EP) ..................................... 18186113

(51) Int. Cl.
*H02K 9/28* (2006.01)
*F03D 80/60* (2016.01)
(Continued)

(52) U.S. Cl.
CPC .............. *H02K 9/28* (2013.01); *F03D 80/60* (2016.05); *H01R 39/385* (2013.01); *H02K 7/183* (2013.01);
(Continued)

(58) Field of Classification Search
CPC ........ H02K 9/28; H02K 7/183; H02K 13/003; F03D 80/60; F05D 2260/221; F05D 2260/30; H01R 39/385
See application file for complete search history.

(56) References Cited

U.S. PATENT DOCUMENTS 3,784,855 A * 1/1974 Motegi ..................... H02K 9/28
                                                                310/227
3,984,716 A * 10/1976 Stark ..................... H02K 13/003
                                                                310/227
(Continued)

FOREIGN PATENT DOCUMENTS

CN            1142698 A      2/1997
CN          103733444 A      4/2014
(Continued)

OTHER PUBLICATIONS

The Chinese Search Report dated Nov. 23, 2021 with respect to counterpart Chinese patent application 201980049913.3.
(Continued)

*Primary Examiner* — Pedro J Cuevas
(74) *Attorney, Agent, or Firm* — Henry M. Feiereisen LLC

(57) ABSTRACT

A holding apparatus for a slip ring unit includes at least two slots configured for receiving slip ring brushes respectively, with the at least two slots being arranged in spaced-apart relationship. A cooling duct is arranged between the at least two slots for cooling a side surface of the slip ring brushes. The cooling duct is configured as a third slot between the at least two slots, with the at least two slots and the cooling duct being of essentially identical shape and dimension.

17 Claims, 3 Drawing Sheets

(51) Int. Cl.
    *H02K 7/18*     (2006.01)
    *H02K 13/00*    (2006.01)
    *H01R 39/38*    (2006.01)

(52) U.S. Cl.
    CPC ..... *H02K 13/003* (2013.01); *F05D 2260/221* (2013.01); *F05D 2260/30* (2013.01)

(56) References Cited

U.S. PATENT DOCUMENTS

| | | | | |
|---|---|---|---|---|
| 4,137,474 | A * | 1/1979 | Krieger | H01R 39/08 |
| | | | | 310/227 |
| 5,054,189 | A | 10/1991 | Bowman et al. | |
| 7,352,091 | B2 * | 4/2008 | Bradfield | H02K 5/207 |
| | | | | 310/68 D |
| 7,417,344 | B2 * | 8/2008 | Bradfield | H02K 19/365 |
| | | | | 310/90 |
| 11,323,010 | B2 * | 5/2022 | Floß | H02K 9/28 |
| 11,336,152 | B2 * | 5/2022 | Binder | H02K 13/003 |
| 11,387,713 | B2 * | 7/2022 | Binder | H02K 9/28 |
| 2006/0043805 | A1 * | 3/2006 | Bradfield | H02K 11/05 |
| | | | | 310/90 |
| 2007/0210662 | A1 * | 9/2007 | Bradfield | H02K 11/33 |
| | | | | 310/90 |
| 2018/0166844 | A1 | 6/2018 | Maier et al. | |
| 2018/0375404 | A1 * | 12/2018 | Chen | H02K 13/003 |
| 2020/0076274 | A1 * | 3/2020 | Binder | H02K 9/28 |
| 2021/0013779 | A1 * | 1/2021 | Binder | H02K 9/06 |
| 2021/0036582 | A1 * | 2/2021 | Floß | H02K 13/003 |
| 2021/0218211 | A1 * | 7/2021 | Binder | H01R 39/08 |
| 2021/0313863 | A1 * | 10/2021 | Binder | H02K 13/003 |
| 2022/0224204 | A1 * | 7/2022 | Binder | H02K 9/26 |

FOREIGN PATENT DOCUMENTS

| | | | |
|---|---|---|---|
| CN | 104782002 A | 7/2015 | |
| CN | 106451919 A | 2/2017 | |
| EP | 2 961 009 A1 | 12/2015 | |
| EP | 3322047 A1 * | 5/2018 | ............. F03D 80/60 |
| EP | 3745544 A1 * | 12/2020 | ............. F03D 80/60 |
| JP | S5643282 U | 4/1981 | |
| WO | WO 2016/192883 A1 | 12/2016 | |
| WO | WO 2018001591 A1 | 1/2018 | |
| WO | WO-2020020722 A1 * | 1/2020 | ............. F03D 80/60 |

OTHER PUBLICATIONS

Translation of the Chinese Search Report dated Nov. 23, 2021 with respect to counterpart Chinese patent application 201980049913.3.
PCT International Search Report and Written Opinion of International Searching Authority dated Oct. 9, 2019 corresponding to PCT International Application No. PCT/EP2019/069245 filed Jul. 17, 2019.

* cited by examiner

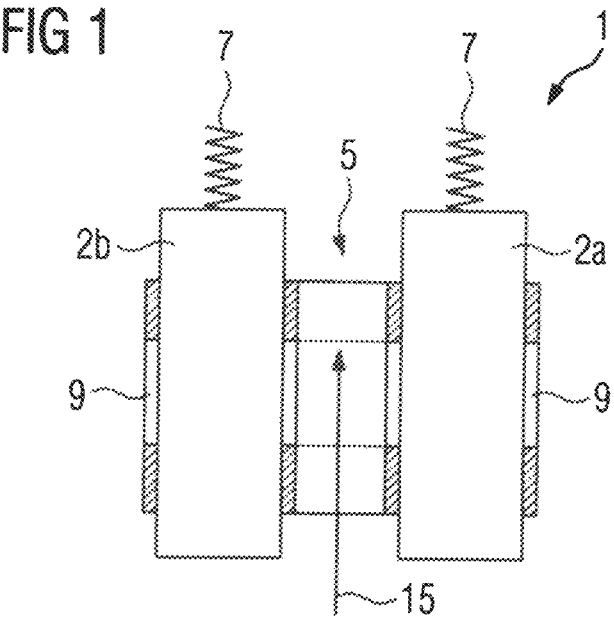
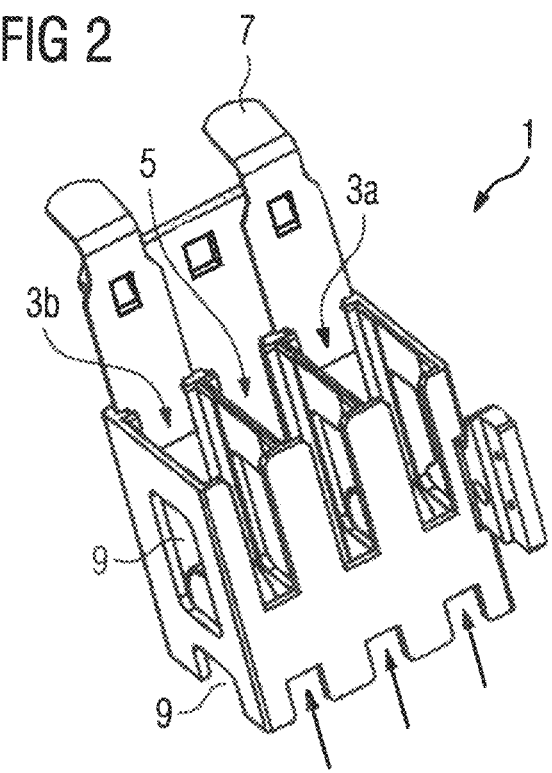

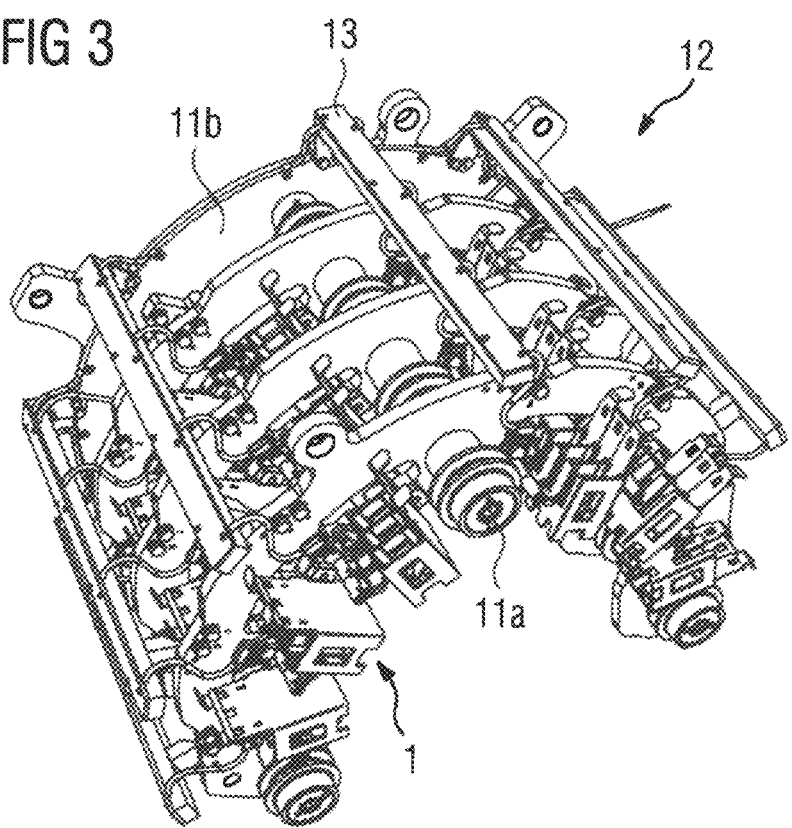

HOLDING APPARATUS FOR A SLIP RING UNIT, SLIP RING BRIDGE, SLIP RING UNIT, ELECTRIC MACHINE, AND WIND TURBINE

CROSS-REFERENCES TO RELATED APPLICATIONS

This application is the U.S. National Stage of International Application No. PCT/EP2019/069245, filed Jul. 17, 2019, which designated the United States and has been published as International Publication No. WO 2020/020722 A1 and which claims the priority of European Patent Application, Serial No. 18186113.9, filed Jul. 27, 2018, pursuant to 35 U.S.C. 119(a)-(d).

BACKGROUND OF THE INVENTION

The invention relates to a holding apparatus for a slip ring unit and also a slip ring bridge and a slip ring unit. Furthermore, the invention relates to an electric machine or a wind turbine.

Slip ring units have holding apparatuses for slip ring brushes, Electrical power is transmitted from a so-called brush bridge to a slip ring with the aid of slip ring brushes, also referred to as brushes. A brush bridge in general has multiple holding apparatuses for one slip ring brush in each case. The slip ring brush is positioned with the aid of the brush bridge or the respective holding apparatus in such a manner that electrical energy can be transmitted from the brush bridge (stationary) to the slip ring (rotatable) during a rotational movement of a slip ring.

The cooling of the slip ring is of great Importance during the transmission of high electrical powers.

WO 2016/192 883 A1 discloses an arrangement for guiding and/or holding electrically conductive slip contact elements. In order to ventilate brushes, EP 2 961 009 A1 discloses projections on a rotational body for generating a cooling airflow.

JP S56 43 282 U discloses an arrangement of two brush holders having in each case a plurality of brushes and a ventilation duct that is arranged between the brush holders.

The object of the invention is accordingly to improve the cooling of the slip ring unit.

The object is achieved by a holding apparatus for a slip ring unit as set forth hereinafter. The object is further achieved by a brush bridge as set forth hereinafter.

Furthermore, the object is achieved by a slip ring unit as set forth hereinafter, an electric machine as set forth hereinafter, and a wind turbine as set forth hereinafter.

Advantageous embodiments of the invention and developments are the subject matter of the dependent claims.

The invention is based on an idea that an airflow that is provided in particular by a slip ring in the axial direction is used to cool the slip ring brushes. The advantageous holding apparatus has two slots for slip ring brushes that are arranged spaced from one another by a cooling duct. The respective slot is used so as to receive a slip ring brush. The cooling duct preferably extends between the slots. The cooling duct is used so as to space the slots. The airflow preferably extends through the cooling duct and is therefore provided so as to cool the side surfaces, which are adjacent to one another, of the slip ring brushes. In order to further improve the cooling of the slip ring brushes, openings are used, wherein the openings are incorporated into the holding apparatus for the slip ring brushes for the improved supply of air to the slip ring brushes. The openings can be embodied at least in part also in the form of recesses.

The holding apparatus for a slip ring unit comprises at least two slots for one slip ring brush in each case, wherein the slots are arranged spaced from one another, wherein the slots are separated by one cooling duct in each case, characterized in that the respective cooling duct is in each case positioned between the slots and the respective cooling duct is embodied so as to cool a side surface of the respective slip ring brush.

The term "a holding apparatus" is preferably understood to mean an apparatus for receiving at least two slip ring brushes. The respective slip ring brush is advantageously used so as to transmit electrical power to a contact element of a slip ring.

The holding apparatus is preferably used so as to position and to orient the respective slip ring brush.

The holding apparatus is preferably embodied from a plastic, a composite material or a ceramic material. It is particularly advantageous that the holding apparatus is embodied from a metal such as brass or copper.

The cooling duct can be embodied on its outer side in regions from a cooling layer of a material that conducts electricity effectively, by way of example a metal. The cooling layer is preferably positioned between the respective slot of the cooling duct and the cooling duct.

The cooling duct is used so as to receive an airflow. The airflow flows through the cooling duct. It is preferred that the cooling duct is oriented in the radial direction with respect to an axle of the slip ring. Accordingly, the cooling duct is used so as to receive an airflow that extends in the radial direction.

The slip ring brushes that can be inserted preferably have a rectangular cross section, wherein the (side) surfaces of the slip ring brushes are spaced with the larger surface with respect to one another. The slots are preferably dimensioned in such a manner that the respective slip ring brush adjoins the inner surface at least on two sides. It is preferred that the side surfaces of the slip ring brushes and consequently the sides of the respective slot are embodied as parallel with respect to one another.

It is preferred that the holding apparatus has three slots, wherein the outer two slots are embodied for insertion of the respective slip ring brush.

The cooling duct is positioned in accordance with the invention as a third slot between slots for the respective slip ring brush.

For a particularly simple production of the holding apparatus it is provided that the slots and also the cooling duct have an essentially identical shape and dimensions.

It is possible owing to the invention to significantly improve the cooling of the slip ring brushes.

In the case of an advantageous embodiment of the invention, the respective slot has an opening on at least one side surface, wherein the openings embody an access to the respective slip ring brush.

The opening forms an access from the cooling duct to the respective slip ring brush. The opening is preferably used so as to directly connect the airflow to the respective slip ring brush. The opening is used further preferably for an improved cooling of the respective slip ring brush.

Further openings can be embodied optionally on further sides of the slots.

The openings are not necessarily provided with a closed edge embodied from material. The respective opening can also be embodied by a recess in the material.

The respective opening is preferably also used so as to reduce the weight of the respective holding apparatus.

Furthermore, the respective opening of the holding apparatus improves the cooling of the respective slip ring brush.

In a further advantageous embodiment of the invention, the opening connects the cooling duct to the respective slot.

It is possible for the airflow to make direct contact with the respective slip ring brush through the opening that is positioned between the cooling duct and the respective slot. It is preferred that the airflow extends through the cooling duct with the result that the sides of the slip ring brush that in each case face one another can be cooled with the aid of the openings.

In particular the opening between the respective slot and the cooling duct can also be embodied as a recess. In the case of the recess, a layer that is used so as to separate the respective slot from the cooling duct can only be embodied in the edge region. It is preferred that a layer of half a millimeter to 2 millimeters wide is only arranged in regions between the cooling duct and the respective slot.

A particularly effective cooling of the respective slip ring brush is possible owing to the opening or the recess between the respective slot and the cooling duct.

In the case of a further advantageous embodiment of the invention, at least one resilient element is provided so as to position and/or orient the respective slip ring brush.

The resilient element is preferably embodied as a leaf spring. The resilient element is preferably used so as to position the slip ring brush in such a manner that one side of the slip ring brush contacts the respective contact surface of the slip ring brush during the rotational movement of a slip ring.

The positioning or orientation of the respective slip ring brush is preferably provided by the contact of the slip ring brush to the inner surface of the respective slot. It is also possible owing to the contact to improve the cooling, in particular in the event of the holding apparatus comprising a material that conducts heat effectively such as a metal.

The resilient element can furthermore contribute to the improved contacting arrangement of a current line to the slip ring brush. It is preferred that with the aid of the resilient element the respective slip ring brush is positioned and/or oriented in such a manner that it is ensured that the respective slip ring brush is connected over a large area to a connecting element so as to transmit the electrical power to the slip ring brush.

In the event of interruptions in a transmission of electrical power, heat is generally produced so that the resilient element contributes functionally towards avoiding this heat.

The resilient element consequently preferably contributes both to the improved cooling as well as to the most continuous transmission of electrical power possible.

In a further advantageous embodiment of the invention, the respective slot is arranged on one side of the cooling duct. Alternatively, the cooling duct covers only a small part of the respective side surface of the respective slot.

It is preferred that the respective insert is arranged on a side surface of the cooling duct that is in each case facing the other side surface.

It is preferred that the side surfaces of the respective slots and therefore the side surfaces of the respective slip ring brush are embodied as parallel.

In the case of a further advantageous embodiment of the invention, the holding apparatus is embodied from a plastic, a metal that is easy to process or a composite material.

Teflon (polytetrafluorethylene) or a synthetic resin is an example of a material that is suitable for the holding apparatus. Alternatively, a composite material such as fiber glass is well suited owing to the high mechanical stability.

It is particularly preferred that the holding apparatus is embodied from a metal, such as aluminum, bronze, brass, copper or stainless steel.

Depending on the contacting of the slip ring brush, a metal can also be used so as to receive the slip ring brushes. The use of a metal is in particular advantageous in the event of all slip ring brushes in a holding apparatus having the same electrical potential.

A simple production of a holding apparatus that is described here is possible owing to the use of a metal that is easy to process.

The slip ring bridge has at least one bow-shaped base element, wherein at least one holding apparatus that is described here is fastened to the bow-shaped base element, so that the slots of the respective holding element are oriented in such a manner that the slip ring brush that in each case can be inserted into the slot are oriented orthogonally with respect to a cylindrical peripheral surface, in particular of a contact surface of a slip ring.

The slip ring bridge is advantageously used so as to position and/or to orient the respective slip ring brush. The slip ring brushes are positioned in the holding apparatuses, wherein the respective holding apparatus is fastened to a bow-shaped base element.

The bow-shaped base elements are advantageously formed and arranged in such a manner that they are embodied in regions so as to include a slip ring.

The bow-shaped base element advantageously extends in regions around an axle of the slip ring, wherein the side that is facing the axle extends at a distance of 5 millimeters to 20 millimeters along the peripheral surface of the slip ring. An inner radius of the bow-shaped base element is accordingly embodied slightly larger than the radius of the peripheral surface of the slip ring.

It is preferred that the respective bow-shaped base element is allocated to an electrical current phase. The holding apparatuses that are fastened to the respective base element are preferably in each case electrically connected. A particularly efficient transmission of the electrical power is possible owing to the electrical connection of the slip ring brushes in the holding apparatuses that are fastened to in each case a bow-shaped base element.

It is preferred that the bow-shaped base elements are produced from metal, by way of example aluminum or stainless steel.

The bow-shaped base elements are embodied as particularly stable owing to the production of these bow-shaped base elements from metal. Moreover, owing to their effective conduction of heat the bow-shaped base elements contribute to the improved cooling of the slip ring brushes and/or to the improved cooling of the respective holding apparatus.

The bow-shaped base element can have shaped areas, in particular cooling lugs, so as to improve the cooling.

The bow-shaped slip ring element is preferably essentially formed like an annular section. Owing to the shape, the holding elements and consequently the slip ring brushes can be arranged in each case in a radial orientation around a slip ring.

The slip ring bridge is embodied preferably in a round or polygonal manner on the side that faces radially inwards. The surface that faces radially inwards surrounds a slip ring at a distance.

In a further advantageous embodiment of the invention, the slip ring bridge has multiple radial base elements, wherein the bow-shaped base elements can be connected to at least one axial base element and wherein the bow-shaped base elements are oriented so that the respective holding apparatuses that are fastened to the bow-shaped base element are embodied as parallel with respect to one another.

The peripheral surface of the slip ring bridge is preferably essentially replicated in the peripheral surface of the slip ring. It is preferred that the peripheral surface is embodied with a slightly larger radius with the result that a spacing of the peripheral surface is bridged by the slip ring brushes.

The respective axial base element is used so as to space the bow-shaped base elements from one another. It is preferred that at least three axial base elements are provided in order to ensure a parallel orientation of the bow-shaped base elements.

The axial base elements preferably extend parallel with respect to the axle of the slip ring.

The respective axial base element preferably comprises a metal bolt and a sheath that is embodied from plastic. The metal bolt is used preferably for the stable connection of the bow-shaped base elements. The sheath that is preferably embodied from plastic is used preferably so as to insulate the bow-shaped base elements from one another.

The axial base elements optionally have projections. The projections are used so as to extend the creepage distance and consequently for the improved insulation of the bow-shaped base elements.

The phases of a multi-phase alternating current can be provided easily and securely insulated from one another to a slip ring owing to the bow-shaped base elements that are arranged spaced from one another.

It is possible to provide a particularly compact and stable construction of the slip ring unit owing to the construction of the slip ring bridge.

In the case of a further advantageous embodiment of the invention, the respective bow-shaped base element is embodied at least in part from a metal, in particular copper, aluminum, or stainless steel, wherein the bow-shaped base element is embodied so as to electrically connect the slip ring brushes that are allocated to the respective bow-shaped base element.

The bow-shaped base element is preferably embodied from a metal that conducts electricity effectively or is to a great extent embodied from a metal that conducts electricity effectively.

Copper, aluminum, brass or bronze are suitable in particular as a metal that conducts electricity effectively.

It is preferred that the holding apparatuses are connected by an electrically conductive screw connection to the bow-shaped base element allocated in each case. The screw connection is advantageously used for the electrical connection of the bow-shaped base element via the respective resilient element to the respective slip ring brush.

The bow-shaped base element can be advantageously encompassed by an insulating layer to a large extent. Such an insulating layer is advantageously used so as to reduce unforeseen discharges.

In the case of a further advantageous embodiment of the invention, the respective axial base element is embodied so as to insulate and/or so as to space the respective bow-shaped base elements from one another.

In the case of a further advantageous embodiment of the invention, the slip ring bridge has at least four bow-shaped base elements that are positioned in each case spaced from axial base elements in a parallel orientation.

It is preferred that the slip ring bridge is used so as to provide a three-phase alternating current. Furthermore, it is preferred that a constant potential (ground potential, zero potential) is provided for the slip ring. The three-phase alternating current is advantageously provided by a multiplicity of slip ring brushes that are arranged in each case spaced from one another and are to a bow-shaped base element allocated in each case.

The constant potential is preferably provided likewise by slip ring brushes. The slip ring brushes that are provided so as to provide the constant potential are preferably allocated to a fourth bow-shaped base element.

It is possible owing to the preferred construction to easily provide a three-phase alternating current to a slip ring.

The slip ring unit has a slip ring and a slip ring bridge that is described here, wherein the slip ring comprises one or multiple contact surfaces, wherein the contact surfaces are arranged in each case spaced from one another circumferentially around the peripheral surface of the slip ring, wherein the slip ring has recesses in the respective contact surface, and the recesses, in particular when the slip ring rotates, provide an airflow in the radial direction through the cooling duct of the respective holding apparatus, wherein the airflow is embodied so as to cool at least one side surface of the respective slip ring brush.

The slip ring has recesses on its contact surface, wherein the recesses are embodied so as to provide a radial airflow. In particular, holes that issue into the recess of the slip ring are used so as to provide the airflow. Furthermore, the slip ring advantageously has impressions, wherein the impressions induce the airflow during a rotational movement of the slip ring.

The recesses are positioned in the contact surfaces in such a manner that the airflow flows into the shaft and consequently flows between the slip ring brushes. The airflow is used so as to cool the slip ring and the respective slip ring brush.

One advantageous slip ring comprises insulating regions and contact regions that are arranged in each case between the insulating regions. The contact regions can be embodied in each case cylindrically and advantageously have contact regions on their peripheral surface. The contact regions are preferably separated by a shaped area in the tangential direction. The recess can extend as far into the contact region so that holes that lead in the axial direction through the contact region advantageously issue into the recess of the slip ring. An airflow that extends in the axial direction can be transferred through the openings into the recess of the slip ring and diverted into an airflow in the radial direction, Impressions on the underside of the recess are advantageously used so as to amplify the airflow during a rotational movement of the slip ring in the radial direction. The airflow that can issue from the slip ring is advantageously used so as to cool slip ring brushes and the inner side of the recess, wherein the slip ring brushes can be provided so as to transfer electrical power to the slip ring.

In a further advantageous embodiment of the invention, the openings are embodied so as to influence the respective slip ring brush with the airflow.

The openings are used for the direct supply of the airflow that issues from the slip ring to the slip ring brushes.

A particularly effective cooling of the slip ring brushes is provided by the direct contact of the airflow to the slip ring brushes.

The invention is preferably used for use in externally excited electric machines. Externally excited electric machines are used in particular when electric machines are used as generators. In particular when such generators are used in wind turbines it is necessary to transmit high electrical powers. In the case of such high powers, the cooling is of particular importance. Furthermore, the invention that is described here can be embodied in a particularly compact manner.

In one advantageous embodiment of the invention, this invention can be used so as to transmit electrical powers of at least one megawatt, preferably an electrical power of at least five megawatt.

Optionally or in addition, an invention that is described here is used in the transmission of an electrical power for an electric pitch drive in a wind turbine.

BRIEF DESCRIPTION OF THE DRAWING

The invention is further described and explained below with reference to figures. The figures only illustrate exemplary embodiments of the invention and do not limit the invention in any way. The features that are illustrated in the figures can be combined to form new embodiments of the invention. In the drawings:

FIG. 1 shows a schematic diagram of a holding apparatus,
FIG. 2 shows an exemplary holding apparatus,
FIG. 3 shows an exemplary slip ring bridge, and also

DETAILED DESCRIPTION OF PREFERRED EMBODIMENTS

Figure 4:
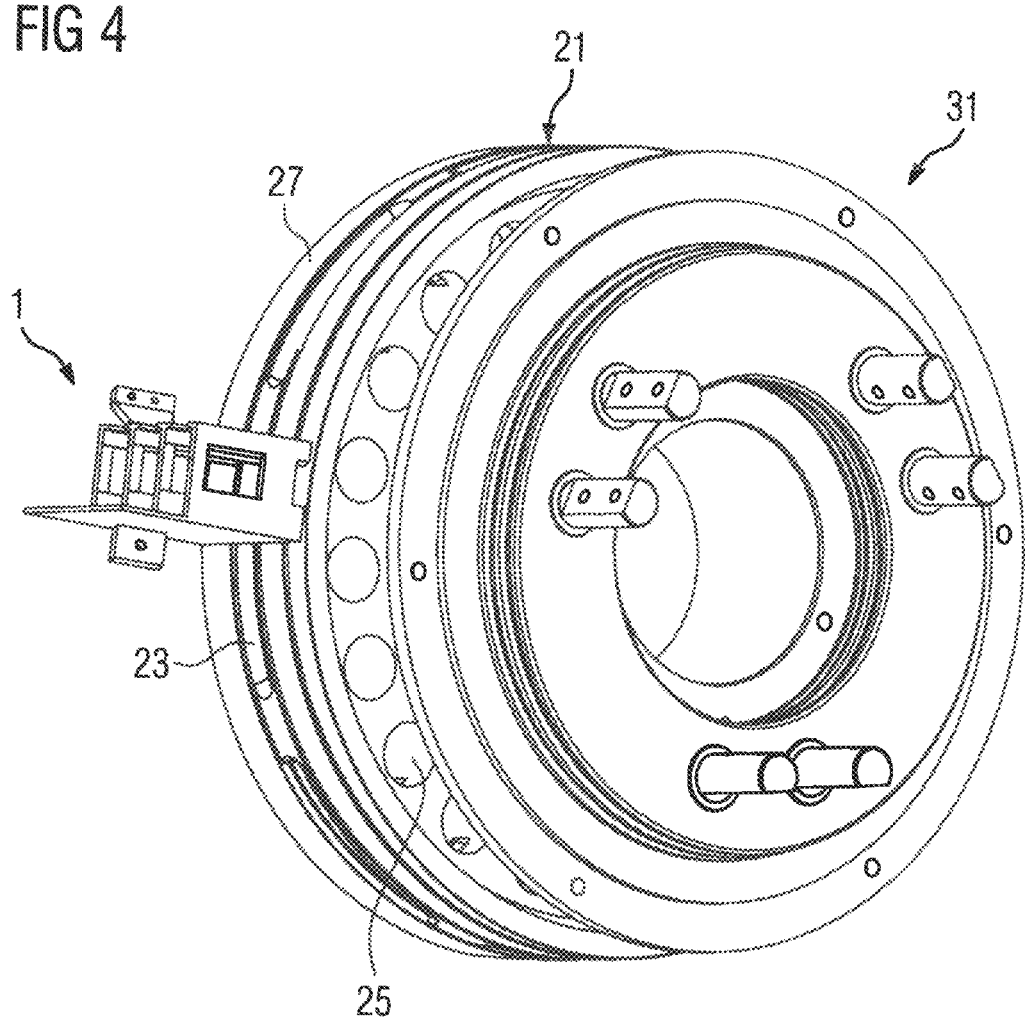
FIG. 4 shows an exemplary slip ring unit.

FIG. 1 illustrates a schematic diagram of a holding apparatus 1. The holding apparatus 1 has two slots 3a, 3b, wherein the slots 3a, 3b are provided so as to receive one slip ring brush 2a, 2b in each case. The respective slip ring brush 2a, 2b is in each case fixed in its position by a resilient element 7. With the aid of the resilient element 7, the slip ring brush is preferably positioned in such a manner that it contacts the contact surface of a slip ring (not illustrated) during the rotational movement of the slip ring the slip ring brush (2a, 2b).

A cooling duct 5 is positioned between the slots 3a, 3b. The cooling duct 5 is used so as to provide an airflow 15. The airflow 15 is used so as to cool the respective slip ring brush 2a, 2b. The cooling duct 5 is positioned between the two slots 3a, 3b with the result that the airflow 15 in each case cools a side surface of the respective slip ring brush 2a, 2b. The holding apparatus 1 has openings 9 for the improved cooling of the respective slip ring element 2a, 2b. The openings 9 are used for direct contact between the airflow 15 and the respective slip ring brush 2a, 2b.

FIG. 2 illustrates an exemplary holding apparatus 1. The holding apparatus comprises in each case a slot 3a, 3b. The respective slot 3a, 3b is separated by a cooling duct 5. The cooling duct 5 is positioned between the two slots 3a, 3b. Openings 9 between the respective slot 3a, 3b and the cooling duct 5 are used for a possible direct contact of the slip ring brush 2a, 2b to the airflow 15 (not illustrated). Further openings 9 are used for the improved cooling of the respective slip ring brush 2a, 2b. The resilient element 7 that is illustrated in the figure is used so as to position and to orient the respective slip ring brush 2a, 2b that can be inserted. The arrows that are illustrated in the lower region of the figure are used so as to illustrate the airflow 15. The airflow 15 through the cooling duct 5 is advantageously embodied as more intense than the airflow 15 that is illustrated using arrows to the slots 3a, 3b.

FIG. 3 illustrates an exemplary slip ring bridge 12, The slip ring bridge 12 comprises multiple bow-shaped base elements 11b that are arranged in each case spaced from one another with a plurality of axial base elements 11a. The respective bow-shaped base element 11b is used as a base for fastening the respective holding apparatus 1. The axial base element 11a is used so as to space and so as to insulate the respective bow-shaped base element 11b. The respective holding apparatus 1 is embodied with a contact element so that an electrical contact can be provided between a current rail 13 and the respective slip ring brush 2a, 2b (not illustrated).

The slip ring bridge 12 is used so as to transmit electrical power to a slip ring 21. The slip ring 21 has three phases in one possible embodiment, wherein the three phases can be transmitted in each case using slip ring brushes 2a, 2b to the slip ring 21, The slip ring brushes 2a, 2b are positioned in holding apparatuses 1. The holding apparatuses 1 are fastened in each case to a bow-shaped base element 11b.

FIG. 4 illustrates a slip ring unit 31. The slip ring unit comprises a slip ring 21 and a holding apparatus 1. The holding apparatus 1 is used so as to receive slip ring brushes 2a, 2b (not illustrated), The respective slip ring brush 2a, 2b is applied in each case to a contact surface 27 of the slip ring 21. The contact surface 27 has a recess 23, wherein the recess 27 is a possible origin of the airflow 15. The airflow 15 is transferred in particular through the holes 25 from an axial direction into the recess. The airflow 15 that is provided with the aid of the slip ring 21 is used so as to cool the slip ring brushes 2a, 2b that are positioned in the holding apparatus 1, The airflow 15 in this case flows through the cooling duct 5 of the holding apparatus 1.

In summary, the invention relates to a holding apparatus for a slip ring unit and also a slip ring bridge 12 and a slip ring unit. Furthermore, the invention relates to an electric machine or a wind turbine in each case having such a slip ring bridge 12 or such a holding apparatus 1. The holding apparatus comprises two slots 3a, 3b for one slip ring brush 2a, 2b in each case. The slots are arranged spaced from one another by a cooling duct 5. The cooling duct 5 is used so as to cool the respective slip ring brush 2a, 2b that can be inserted into the respective slot. The cooling duct 5 preferably has openings 9 so that a direct exchange of heat can be provided between an airflow 15 and the slip ring brush 2a, 2b. The airflow 15 in this case advantageously extends in the radial direction and is provided by a slip ring 21. With the aid of the invention, it is possible to ensure an improved cooling of a slip ring unit and therefore a transmission of an electrical power in the megawatt range.

The invention claimed is:

1. A holding apparatus for a slip ring unit, said holding apparatus comprising:
    at least two slots configured for receiving slip ring brushes respectively, said at least two slots being arranged in spaced-apart relationship; and
    a cooling duct arranged between the at least two slots for cooling a side surface of the slip ring brushes, said cooling duct being configured as a third slot between the at least two slots, with the at least two slots and the cooling duct being of essentially identical shape and dimension.

2. The holding apparatus of claim 1, wherein each of the at least two slots has an opening on a side surface to provide access to a respective one of the slip ring brushes.

3. The holding apparatus of claim 2, wherein the opening of each of the at least two slots connects the cooling duct to the corresponding one of the at least two slots.

4. The holding apparatus of claim 1, further comprising a resilient element configured to position and/or orient a respective one of the slip ring brushes.

5. The holding apparatus of claim 1, wherein the holding apparatus is made from a plastic or a composite material.

6. A slip ring bridge, comprising a bow-shaped base element for attachment of a holding apparatus which includes at least two slots in spaced-apart relationship which are configured for insertion of slip ring brushes respectively and oriented such that the slip ring brushes are oriented orthogonally with respect to a cylindrical peripheral surface, in particular with respect to a contact surface of a slip ring.

7. The slip ring bridge of claim 6, further comprising a plurality of said bow-shaped base element configured for attachment of a plurality of holding apparatuses, and an axial base element configured to connect the bow-shaped base elements, said bow-shaped base elements oriented such that the holding apparatuses are fastened to the bow-shaped base elements in parallel relationship.

8. The slip ring bridge of claim 1, wherein the bow-shaped base element is made at least in part from a metal, in particular copper, aluminum or stainless steel, said bow-shaped base element configured to electrically connect the slip ring brushes inserted in the at least two slots of the holding apparatus.

9. The slip ring bridge of claim 6, further comprising at least four of said bow-shaped base element and a plurality of axial base elements configured to maintain the bow-shaped base elements in spaced-apart parallel relationship.

10. A slip ring unit, comprising:
a slip ring having peripheral surface and including a contact surface on the peripheral surface;
a holding apparatus including at least two slots configured for insertion of slip ring brushes respectively, said at least two slots being arranged in spaced-apart relationship and oriented such that the slip ring brushes are oriented orthogonally with respect to the peripheral surface, in particular with respect to the contact surface of the slip ring, said holding apparatus comprising a cooling duct arranged between the at least two slots for cooling a side surface of the slip ring brushes, said cooling duct being configured as a third slot between the at least two slots, with the at least two slots and the cooling duct being of essentially identical shape and dimension; and
a slip ring bridge comprising a bow-shaped base element for attachment of the holding apparatus,
wherein the contact surface of the slip ring is formed with a recess to enable an airflow in a radial direction through the cooling duct of the holding apparatus, in particular when the slip ring rotates, for cooling a side surface of the slip ring brushes.

11. The slip ring unit of claim 10, wherein the slip ring includes a plurality of said contact surfaces arranged in circumferentially spaced-apart relation around the peripheral surface.

12. The slip ring unit of claim 10, wherein each of the at least two slots of the holding apparatus has an opening on a side surface to apply the airflow to a respective one of the slip ring brushes.

13. The slip ring unit of claim 12, wherein the opening of each of the at least two slots connects the cooling duct to the corresponding one of the at least two slots.

14. The slip ring unit of claim 10, further comprising a resilient element configured to position and/or orient a respective one of the slip ring brushes.

15. The slip ring unit of claim 10, wherein the holding apparatus is made from a plastic or a composite material.

16. An electric machine, comprising:
a holding apparatus including at least two slots configured for insertion of slip ring brushes respectively, said at least two slots being arranged in spaced-apart relationship and oriented such that the slip ring brushes are oriented orthogonally with respect to the peripheral surface, in particular with respect to the contact surface of the slip ring, said holding apparatus comprising a cooling duct arranged between the at least two slots for cooling a side surface of the slip ring brushes, said cooling duct being configured as a third slot between the at least two slots, with the at least two slots and the cooling duct being of essentially identical shape and dimension; or
a slip ring unit as set forth in claim 10.

17. A wind turbine, comprising:
a holding apparatus including at least two slots configured for insertion of slip ring brushes respectively, said at least two slots being arranged in spaced-apart relationship and oriented such that the slip ring brushes are oriented orthogonally with respect to the peripheral surface, in particular with respect to the contact surface of the slip ring, said holding apparatus comprising a cooling duct arranged between the at least two slots for cooling a side surface of the slip ring brushes, said cooling duct being configured as a third slot between the at least two slots, with the at least two slots and the cooling duct being of essentially identical shape and dimension; or
a slip ring unit as set forth in claim 10.

* * * * *